US00RE49755E

(19) United States
(12) Reissued Patent
Lee et al.

(10) Patent Number: US RE49,755 E
(45) Date of Reissued Patent: Dec. 12, 2023

(54) MOBILE DEVICE INCLUDING A FLEXIBLE DISPLAY DEVICE AND METHOD OF OPERATING THE SAME

(71) Applicant: SAMSUNG DISPLAY CO., LTD., Yongin-si (KR)

(72) Inventors: Yong-Joon Lee, Yongin-si (KR); Woo-Jong Lee, Yongin-si (KR)

(73) Assignee: Samsung Display Co., Ltd., Yongin-si (KR)

(21) Appl. No.: 16/989,786

(22) Filed: Aug. 10, 2020

Related U.S. Patent Documents

Reissue of:
(64) Patent No.: 9,612,621
Issued: Apr. 4, 2017
Appl. No.: 14/165,393
Filed: Jan. 27, 2014

U.S. Applications:
(63) Continuation of application No. 16/375,802, filed on Apr. 4, 2019, now Pat. No. Re. 48,155, which is an application for the reissue of Pat. No. 9,612,621.

(30) Foreign Application Priority Data

Feb. 1, 2013 (KR) ..... 10-2013-0012003

(51) Int. Cl.
*G06F 1/16* (2006.01)

(52) U.S. Cl.
CPC ..... *G06F 1/1643* (2013.01); *G06F 1/1652* (2013.01); *G06F 1/1677* (2013.01)

(58) Field of Classification Search
CPC ..... G06F 1/1677; G06F 1/1652; G06F 1/1643
See application file for complete search history.

(56) References Cited

U.S. PATENT DOCUMENTS 8,896,202 B2 * 11/2014 Oh ..... H01L 51/5237 313/511
9,215,306 B2 12/2015 Kim et al.
(Continued)

FOREIGN PATENT DOCUMENTS

EP 0 899 651 A2 3/1999
KR 10-2010-0009008 A 1/2010
(Continued)

OTHER PUBLICATIONS

Khalilbeigi, et al. "FoldMe: Interacting with Double-Sided Foldable Displays", Proceedings of the 6th International Conference on Tangible, Embedded, and Embodied Interaction (TEI '12), Feb. 19-22, 2012, pp. 33-40.
(Continued)

*Primary Examiner* — Luke S Wassum
(74) *Attorney, Agent, or Firm* — Lewis Roca Rothgerber Christie LLP

(57) ABSTRACT

A mobile device includes a touch-screen having an external touch-screen region, an internal foldable touch-screen region, and a curved-surface touch-screen region that couples the external touch-screen region and the internal foldable touch-screen region, and a body to which the touch-screen is attached, wherein the device is configured to move at least one icon corresponding to at least one executing application program to the curved-surface touch-screen region in response to a folding angle of the internal foldable touch-screen region when a folding operation of the internal foldable touch-screen region is performed.

10 Claims, 10 Drawing Sheets

(56) References Cited

U.S. PATENT DOCUMENTS

| | | | | |
|---|---|---|---|---|
| 9,261,914 | B2 | 2/2016 | Moriwaki | |
| 9,292,201 | B2 | 3/2016 | Joo | |
| 9,491,272 | B2 | 11/2016 | Kim | |
| 9,891,729 | B2 | 2/2018 | Mizunuma et al. | |
| 9,959,030 | B2 | 5/2018 | Sang et al. | |
| 10,142,547 | B2 | 11/2018 | Yamazaki et al. | |
| 10,514,727 | B2 * | 12/2019 | Seo | G09G 3/035 |
| 2006/0274036 | A1 | 12/2006 | Hioki et al. | |
| 2009/0219247 | A1 * | 9/2009 | Watanabe | G06F 1/1615 345/157 |
| 2009/0295731 | A1 * | 12/2009 | Kim | G06F 1/163 345/168 |
| 2010/0007603 | A1 * | 1/2010 | Kirkup | H04M 1/72427 345/158 |
| 2010/0056223 | A1 | 3/2010 | Choi et al. | |
| 2010/0060548 | A1 * | 3/2010 | Choi | G06F 3/0414 345/1.3 |
| 2010/0085382 | A1 | 4/2010 | Lundqvist et al. | |
| 2010/0117975 | A1 | 5/2010 | Cho | |
| 2010/0182265 | A1 | 7/2010 | Kim et al. | |
| 2011/0188189 | A1 | 8/2011 | Park et al. | |
| 2012/0194448 | A1 | 8/2012 | Rothkopf | |
| 2012/0235894 | A1 | 9/2012 | Phillips | |
| 2013/0100055 | A1 | 4/2013 | Lauder et al. | |
| 2013/0127707 | A1 | 5/2013 | Ketola et al. | |
| 2013/0127918 | A1 | 5/2013 | Kang et al. | |
| 2013/0135182 | A1 | 5/2013 | Jung et al. | |
| 2013/0154971 | A1 * | 6/2013 | Kang | G06F 3/0414 345/173 |
| 2013/0222998 | A1 | 8/2013 | Cho et al. | |
| 2013/0321260 | A1 | 12/2013 | Joo | |
| 2014/0015743 | A1 | 1/2014 | Seo et al. | |
| 2014/0176421 | A1 | 6/2014 | Chen | |
| 2014/0375596 | A1 | 12/2014 | Kim et al. | |
| 2015/0130738 | A1 * | 5/2015 | Park | G06F 3/1423 345/173 |

FOREIGN PATENT DOCUMENTS

| | | |
|---|---|---|
| KR | 10-2010-0067933 A | 6/2010 |
| KR | 10-2010-0082451 | 7/2010 |
| KR | 10-2010-0103095 A | 9/2010 |

OTHER PUBLICATIONS

Nagaraju; Novel User Interaction Styles with Flexible/Rollable Screens, 10th Biannual Conference of the Italian SIGCHI Chapter (CHItaly '13), Sep. 16-20, 2013, pp. 33-40.

* cited by examiner

MOBILE DEVICE INCLUDING A FLEXIBLE DISPLAY DEVICE AND METHOD OF OPERATING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

[This application claims priority under 35 USC §119 to Korean Patent Application No. 10-2013-0012003, filed on Feb. 1, 2013 in the Korean Intellectual Property Office (KIPO) the contents of which are incorporated herein in the entirety by reference.] *This application is a continuation reissue of application Ser. No. 16/375,802, filed on Apr. 4, 2019, which is an application for reissue of U.S. Pat. No. 9,612,621 B2, issued Apr. 4, 2017, and filed as U.S. application Ser. No. 14/165,393 on Jan. 27, 2014, which claims priority to, and the benefit of, Korean Application Serial No. 10-2013-0012003, filed in the Korean Intellectual Property Office on Feb. 1, 2013, the entire contents of which are incorporated herein by reference.*

BACKGROUND

1. Field

Example embodiments relate generally to an electronic device.

2. Description of the Related Art

Recently, as studies on flexible display devices are actively performed, a flexible touch-screen having a flexible display device and a touch sensor device has come into the spotlight in a manufacture field of electronic devices. When the flexible touch-screen is applied to any mobile device such as a smart-phone, a smart-pad, a laptop, etc., a shape of the mobile device can depart from conventional shapes of the mobile device (e.g., rectangular, rectangular having rounded edges, rectangular having streamlined sides, etc.). Thus, the mobile device having new shapes may provide various user interfaces to users.

SUMMARY

Some example embodiments provide a mobile device capable of providing various user interfaces to users based on a flexible touch-screen having an external touch-screen region, an internal foldable touch-screen region, and a curved-surface touch-screen region that is placed between the external touch-screen region and the internal foldable touch-screen region (i.e., the curved-surface touch-screen region couples the external touch-screen region and the internal foldable touch-screen region).

Some example embodiments provide a method of operating a mobile device capable of providing various user interfaces to users based on a flexible touch-screen (e.g., of a mobile device) having an external touch-screen region, an internal foldable touch-screen region, and a curved-surface touch-screen region that is placed between the external touch-screen region and the internal foldable touch-screen region (i.e., the curved-surface touch-screen region couples the external touch-screen region and the internal foldable touch-screen region).

According to some example embodiments, a mobile device may include a touch-screen having an external touch-screen region, an internal foldable touch-screen region, and a curved-surface touch-screen region that couples the external touch-screen region and the internal foldable touch-screen region, and a body to which the touch-screen is attached, wherein the device is configured to move at least one icon corresponding to at least one executing application program to the curved-surface touch-screen region in response to a folding angle of the internal foldable touch-screen region when a folding operation of the internal foldable touch-screen region is performed.

The touch-screen may include a flexible touch-screen including a flexible display device and a touch sensor device.

The body may include a flexible material, wherein the body may be configured to support the folding operation of the internal foldable touch-screen region.

The body may include a non-flexible material, wherein the body includes a hinge configured to support the folding operation of the internal foldable touch-screen region.

The internal foldable touch-screen region may include a first internal touch-screen region and a second internal touch-screen region, wherein the first internal touch-screen region and the second internal touch-screen region may be physically coupled.

The internal foldable touch-screen region may include a first internal touch-screen region and a second internal touch-screen region, wherein the first internal touch-screen region and the second internal touch-screen region may be physically separated.

The device may be configured to display the icon corresponding to the application program executed on the external touch-screen region on the curved-surface touch-screen region when the internal foldable touch-screen region is unfolded to equal to or greater than a first folding angle, wherein the device may be configured to execute the application program on a part region or an entire region of the internal foldable touch-screen region when the icon is moved to the internal foldable touch-screen region.

The device may be configured to display the icon corresponding to the application program executed on the internal foldable touch-screen region on the curved-surface touch-screen region when the internal foldable touch-screen region is folded to equal to or smaller than a second folding angle, wherein the device may be configured to execute the application program on a part region or an entire region of the external touch-screen region when the icon is moved to the external touch-screen region.

The icon may be moved from the curved-surface touch-screen region to the internal foldable touch-screen region or the external touch-screen region by a drag-and-drop operation or a click operation according to a user interface.

The first folding angle may be substantially the same as the second folding angle, or may be different from the second folding angle.

The internal foldable touch-screen region may be activated and the external touch-screen region may be deactivated when the internal foldable touch-screen region is unfolded to equal to or greater than the first folding angle.

The internal foldable touch-screen region may be deactivated and the external touch-screen region may be activated when the internal foldable touch-screen region is folded to equal to or smaller than the second folding angle.

According to some example embodiments, a method of operating a mobile device may include executing an application program on an external touch-screen region, displaying an icon corresponding to the application program on a curved-surface touch-screen region that couples the external touch-screen region and an internal foldable touch-screen region when the internal foldable touch-screen region is unfolded to equal to or greater than a folding angle, and executing the application program on a part region or an entire region of the internal foldable touch-screen region when the icon is moved to the internal foldable touch-screen region.

The external touch-screen region, the internal foldable touch-screen region, and the curved-surface touch-screen region may correspond to respective regions of a flexible touch-screen including a flexible display device and a touch sensor device.

The internal foldable touch-screen region may be activated and the external touch-screen region may be deactivated when the internal foldable touch-screen region is unfolded to equal to or greater than the folding angle.

The icon may be moved from the curved-surface touch-screen region to the internal foldable touch-screen region by a drag-and-drop operation or a click operation according to a user interface.

According to some example embodiments, a method of operating a mobile device may include executing an application program on an internal foldable touch-screen region, displaying an icon corresponding to the application program on a curved-surface touch-screen region that couples an external touch-screen region and the internal foldable touch-screen region when the internal foldable touch-screen region is folded to equal to or smaller than a folding angle, and executing the application program on a part region or an entire region of the external touch-screen region when the icon is moved to the external touch-screen region.

The external touch-screen region, the internal foldable touch-screen region, and the curved-surface touch-screen region may correspond to respective regions of a flexible touch-screen including a flexible display device and a touch sensor device.

The internal foldable touch-screen region may be deactivated and the external touch-screen region may be activated when the internal foldable touch-screen region is folded to equal to or smaller than the folding angle.

The icon may be moved from the curved-surface touch-screen region to the external touch-screen region by a drag-and-drop operation or a click operation according to a user interface.

Therefore, a mobile device according to example embodiments may include a flexible touch-screen having an external touch-screen region, an internal foldable touch-screen region, and a curved-surface touch-screen region that couples the external touch-screen region and the internal foldable touch-screen region. Thus, the mobile device may provide users with a user interface that selectively executes an application program on the external touch-screen region or the internal foldable touch-screen region by moving an icon corresponding to an executing application program to the curved-surface touch-screen region in response to a folding angle of the internal foldable touch-screen region when a folding operation of the internal foldable touch-screen region is performed (i.e., when the internal foldable touch-screen region is folded or unfolded).

In addition, a method of operating a mobile device according to example embodiments, where the mobile device includes a flexible touch-screen having an external touch-screen region, an internal foldable touch-screen region, and a curved-surface touch-screen region that couples the external touch-screen region and the internal foldable touch-screen region, may provide users with a user interface that selectively executes an application program on the external touch-screen region or the internal foldable touch-screen region by moving an icon corresponding to an executing application program to the curved-surface touch-screen region in response to a folding angle of the internal foldable touch-screen region when a folding operation of the internal foldable touch-screen region is performed (i.e., when the internal foldable touch-screen region is folded or unfolded).

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
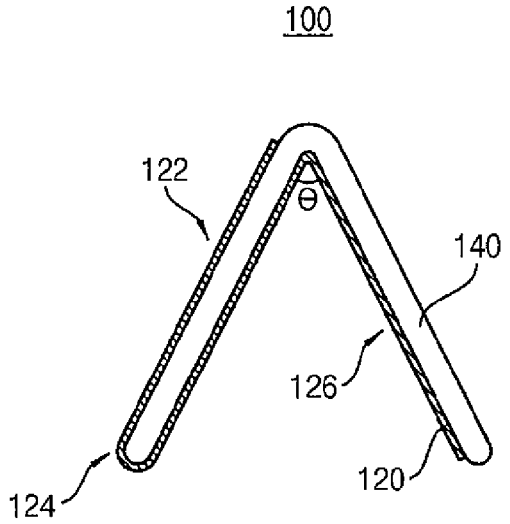
FIG. 1 is a planar view illustrating a mobile device according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be more thorough and more complete, and will more fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments of the present inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
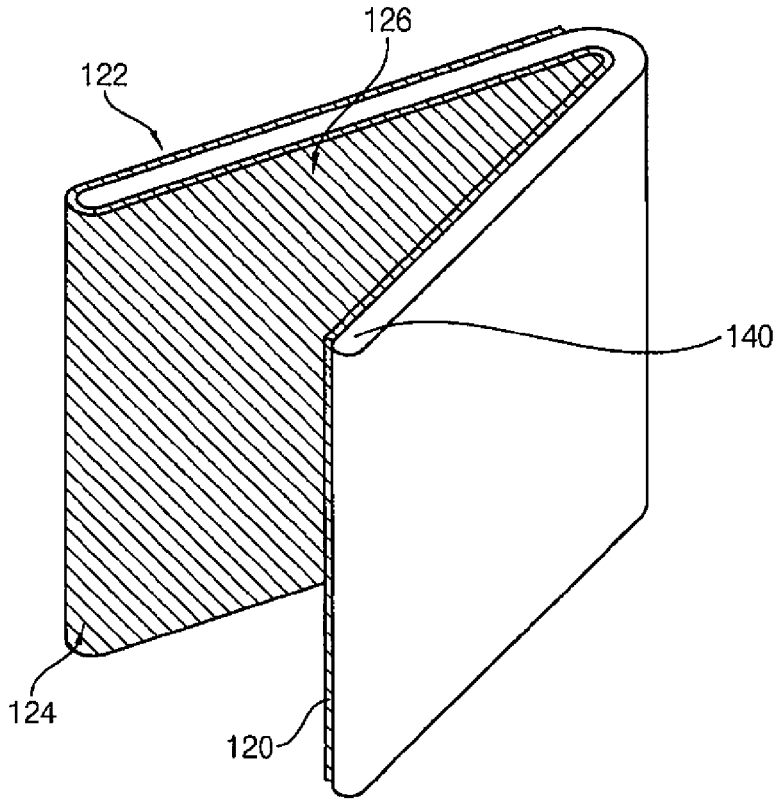
FIG. 2 is a perspective side view illustrating the mobile device shown in FIG. 1.

FIG. 1 is a planar view illustrating a mobile device according to example embodiments. FIG. 2 is a perspective side view illustrating the mobile device shown in FIG. 1.

Referring to FIGS. 1 and 2, the mobile device 100 may include a touch-screen unit (or a touch screen) 120 and a body unit (or a body) 140 to which the touch-screen unit 120 is attached. Here, the touch-screen unit 120 may correspond to a flexible touch-screen having a flexible display device and a touch sensor device. For example, the mobile device 100 may be implemented as a cellular phone, a smart-phone, a smart-pad, etc. However, a type of the mobile device 100 is not limited thereto.

The touch-screen unit 120 may include an external touch-screen region 122, an internal foldable touch-screen region 126, and a curved-surface touch-screen region 124. Here, the curved-surface touch-screen region 124 may be placed between the external touch-screen region 122 and the internal foldable touch-screen region 126. In other words, the curved-surface touch-screen region 124 may couple the external touch-screen region 122 and the internal foldable touch-screen region 126. The body unit 140 may be manufactured with flexible materials, and thus may support a folding operation of the internal foldable touch-screen region 126. Therefore, when the body unit 140 is folded or unfolded by users, the internal foldable touch-screen region 126 of the touch-screen unit 120 may be folded or unfolded. Specifically, the mobile device 100 may move at least one icon corresponding to at least one executing application program to the curved-surface touch-screen region 124 in response to a folding angle θ of the internal foldable touch-screen region 126 when a folding operation of the internal foldable touch-screen region 126 is performed (i.e., when the internal foldable touch-screen region 126 is folded or unfolded). For example, a specific application program may be executed on the external touch-screen region 122 when the body unit 140 is in a folded state. Here, as a user unfolds the body unit 140, the mobile device 100 may move an icon corresponding to the specific application program from the external touch-screen region 122 to the curved-surface touch-screen region 124 when a folding angle θ of the internal foldable touch-screen region 126 becomes equal to or greater than a set folding angle (e.g., a predetermined folding angle). In addition, for example, a specific application program may be executed on the internal foldable touch-screen region 126 when the body unit 140 is in an unfolded state. Here, as a user folds the body unit 140, the mobile device 100 may move an icon corresponding to the specific application program from the internal foldable touch-screen region 126 to the curved-surface touch-screen region 124 when a folding angle θ of the internal foldable touch-screen region 126 becomes equal to or smaller than a set folding angle (e.g., a predetermined folding angle).

In one example embodiment, when the internal foldable touch-screen region 126 is unfolded to equal to or greater than a first folding angle, the mobile device 100 may display an icon corresponding to an application program that is executed on the external touch-screen region 122 on the curved-surface touch-screen region 124. Subsequently, the mobile device 100 may execute the application program on a part region or an entire region of the internal foldable touch-screen region 126 if the icon corresponding to the application program is moved from the curved-surface touch-screen region 124 to the internal foldable touch-screen region 126 by a drag-and-drop operation or a click operation according to a user interface. In another example embodiment, when the internal foldable touch-screen region 126 is folded to equal to or smaller than a second folding angle, the mobile device 100 may display an icon corresponding to an application program that is executed on the internal foldable touch-screen region 126 on the curved-surface touch-screen region 124. Subsequently, the mobile device 100 may execute the application program on a part region or an entire region of the external touch-screen region 122 if the icon corresponding to the application program is moved from the curved-surface touch-screen region 124 to the external touch-screen region 122 by the drag-and-drop operation or the click operation according to the user interface. In one example embodiment, the first folding angle may be substantially the same as the second folding angle. In another example embodiment, the first folding angle may be different from the second folding angle. Additionally, the internal foldable touch-screen region 126 may have a first internal touch-screen region (e.g., a left internal touch-screen region) and a second internal touch-screen region (e.g., a right internal touch-screen region). Here, the first internal touch-screen region and the second internal touch-screen region may be divided with respect to a folding reference line on which the internal foldable touch-screen region 126 is folded. In one example embodiment, the first internal touch-screen region and the second internal touch-screen region may be physically separated. In another example embodiment, as illustrated in FIG. 1, the first internal touch-screen region and the second internal touch-screen region may be physically coupled.

In addition, when an application program is executed on a part region or an entire region of the internal foldable touch-screen region 126 as the internal foldable touch-screen region 126 is unfolded to equal to or greater than the first folding angle, the internal foldable touch-screen region 126 may be activated, and the external touch-screen region 122 may be deactivated. In this case, a touch sensor function and a display function of the external touch-screen region 122 may be deactivated. Alternatively, a touch sensor function or a display function of the external touch-screen region 122 may be deactivated. Similarly, when an application program is executed on a part region or an entire region of the external touch-screen region 122 as the internal foldable touch-screen region 126 is folded to equal to or smaller than the second folding angle, the internal foldable touch-screen region 126 may be deactivated, and the external touch-screen region 122 may be activated. In this case, a touch sensor function and a display function of the internal foldable touch-screen region 126 may be deactivated. Alternatively, a touch sensor function or a display function of the internal foldable touch-screen region 126 may be deactivated. However, embodiments of the present inventive concept are not limited thereto. For example, when certain conditions are met, the external touch-screen region 122 and the internal foldable touch-screen region 126 may be concurrently activated. That is, a user may use both the external touch-screen region 122 and the internal foldable touch-screen region 126 even when an application program is executed on a part region or an entire region of the internal foldable touch-screen region 126 as the internal foldable touch-screen region 126 is unfolded to equal to or greater than the first folding angle, or even when an application program is executed on a part region or an entire region of the external touch-screen region 122 as the internal foldable touch-screen region 126 is folded to equal to or smaller than the second folding angle.

As described above, the touch-screen unit 120 may correspond to the flexible touch-screen having the flexible display device and the touch sensor device. For this reason, the body unit 140 may include a display controller and a touch sensor controller. In addition, the body unit 140 may include a processor, a communication device, a memory device, a storage device, function sensors, etc. The display controller may control a display function of the touch-screen unit 120. The touch sensor controller may control a touch sensor function of the touch-screen unit 120. The processor may perform various computing functions. The processor may be a micro-processor, a central processing unit (CPU), etc. The processor may be coupled to other components via an address bus, a control bus, a data bus, etc. In some example embodiments, the processor may be coupled to an extended bus such as a peripheral component interconnection (PCI) bus. The memory device may store data for operations of the mobile device 100. For example, the memory device may include a volatile semiconductor memory device such as a dynamic random access memory (DRAM) device, a static random access memory (SRAM) device, a mobile DRAM device, etc., and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device may include a solid state drive (SSD) device, a hard disk drive (HDD) device, a CD-ROM device, etc. The function sensors may detect various operations for the mobile device 100. For example, a folding function sensor of the function sensors may detect a folding operation of the mobile device 100.

In brief, the mobile device 100 may include the flexible touch-screen having the external touch-screen region 122, the internal foldable touch-screen region 126, and the curved-surface touch-screen region 124 that is placed between the external touch-screen region 122 and the internal foldable touch-screen region 126. Here, the mobile device 100 may provide users with a user interface that selectively executes an application program on the external touch-screen region 122 or the internal foldable touch-screen region 126 by moving an icon corresponding to an executing application program to the curved-surface touch-screen region 124 in response to a folding angle θ of the internal foldable touch-screen region 126 when a folding operation of the internal foldable touch-screen region 126 is performed (i.e., when the internal foldable touch-screen region 126 is folded or unfolded). As a result, a user may efficiently and conveniently user the mobile device 100.

Figure 3:
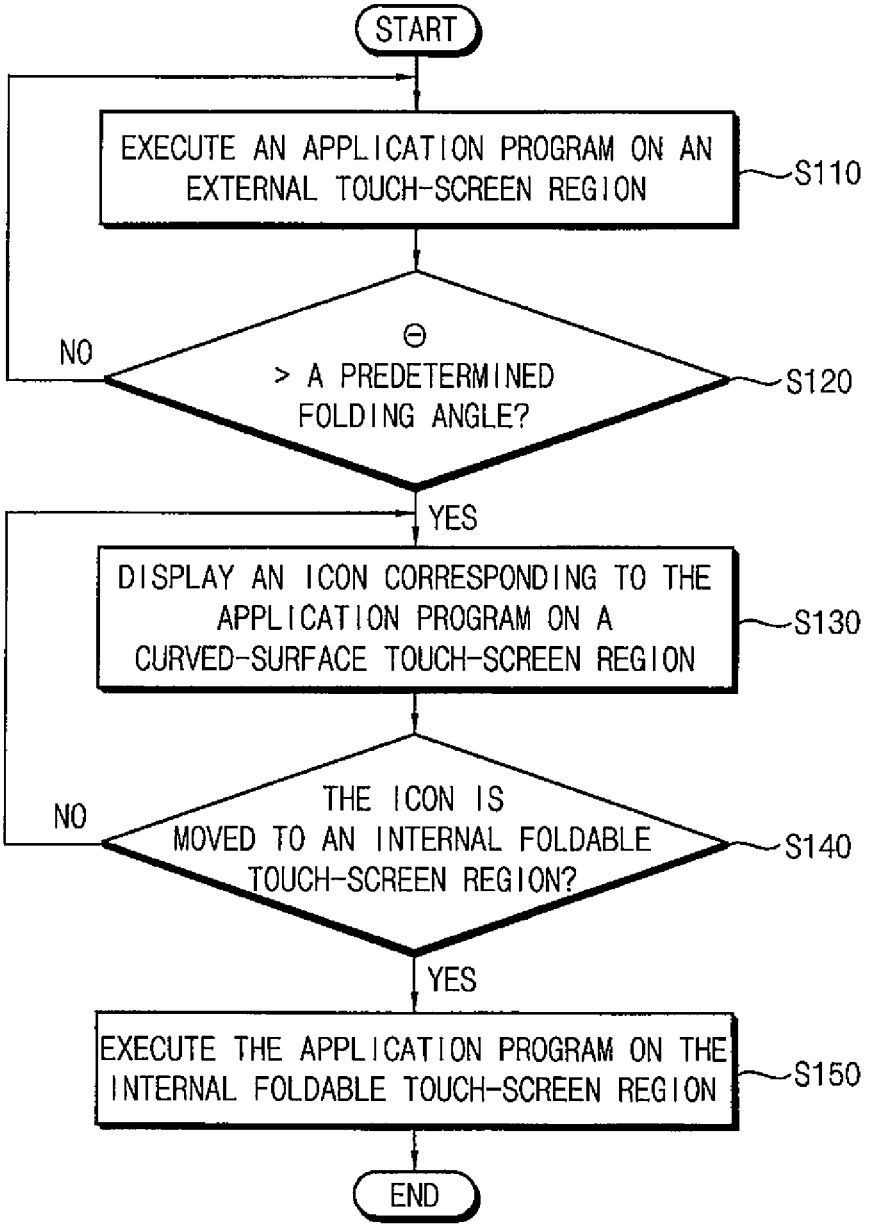
FIG. 3 is a flow chart illustrating an example embodiment in which the mobile device shown in FIG. 1 operates.
Figure 4A:
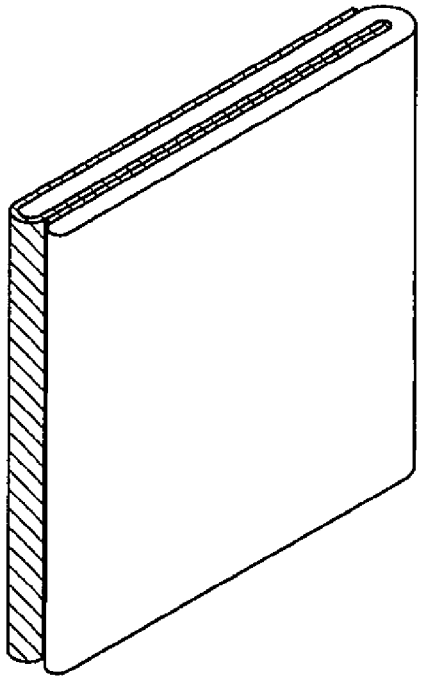
FIGS. 4A, 4B, and 4C are diagrams illustrating an example embodiment in which the mobile device shown in FIG. 1 operates.
Figure 4B:
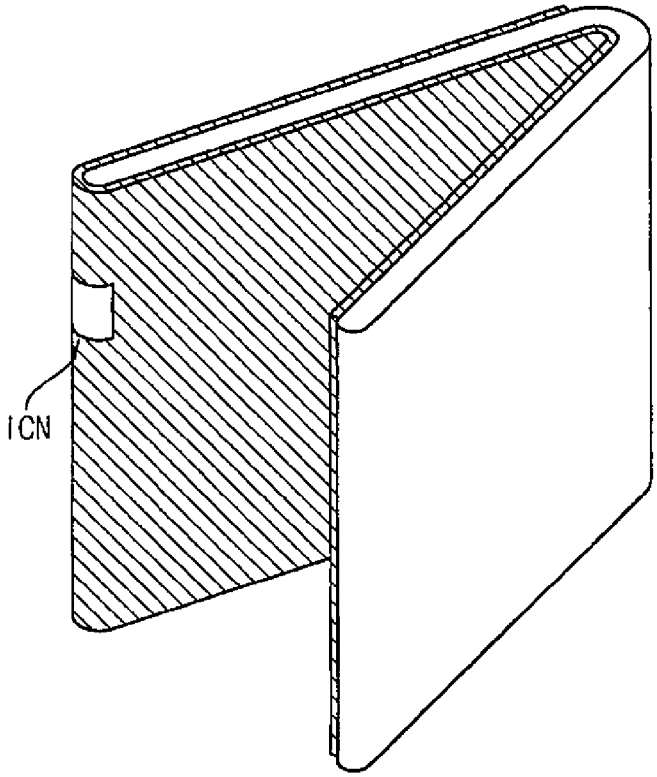
Figure 4C:
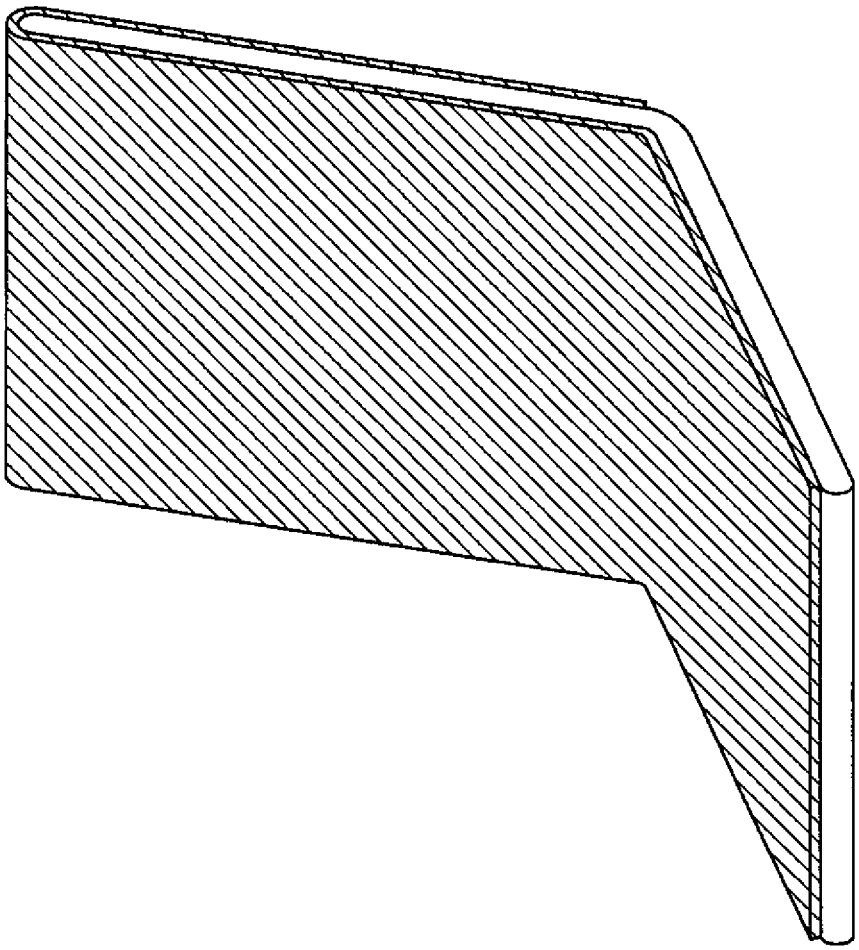

FIG. 3 is a flow chart illustrating an example embodiment in which the mobile device shown in FIG. 1 operates. FIGS. 4A, 4B, and 4C are diagrams illustrating an example embodiment in which the mobile device shown in FIG. 1 operates.

Referring to FIGS. 3, 4A, 4B, and 4C, it is illustrated that the mobile device 100 is in a folded state, and then the mobile device 100 is unfolded. As illustrated in FIG. 4A, the mobile device 100 may execute an application program on the external touch-screen region 122 (Step S110) when the mobile device 100 is in a folded state. Subsequently, the mobile device 100 may sense whether the internal foldable touch-screen region 126 is unfolded to equal to or greater than a set folding angle (e.g., a predetermined folding angle) (Step S120). In other words, the mobile device 100 may sense whether a folding angle θ of the internal foldable touch-screen region 126 becomes equal to or greater than the set folding angle (e.g., the predetermined folding angle) as the internal foldable touch-screen region 126 is unfolded. Here, when the internal foldable touch-screen region 126 is unfolded to smaller than the set folding angle (e.g., the predetermined folding angle), the mobile device 100 may continuously execute the application program on the external touch-screen region 122 (Step S110). On the other hand, as illustrated in FIG. 4B, when the internal foldable touch-screen region 126 is unfolded to equal to or greater than the set folding angle (e.g., the predetermined folding angle), the mobile device 100 may display an icon ICN corresponding to the application program on the curved-surface touch-screen region 124 (Step S130). Next, the mobile device 100 may sense whether the icon ICN corresponding to the application program is moved to the internal foldable touch-screen region 126 (Step S140). For example, the icon ICN corresponding to the application program may be moved from the curved-surface touch-screen region 124 to the internal foldable touch-screen region 126 by a drag-and-drop operation or a click operation according to a user interface. Here, as illustrated in FIG. 4C, when the icon ICN corresponding to the application program is moved to the internal foldable touch-screen region 126, the mobile device 100 may execute the application program on the internal foldable touch-screen region 126 (Step S150). As described above, when the application program is executed on a part region or an entire region of the internal foldable touch-screen region 126 as the internal foldable touch-screen region 126 is unfolded to equal to or greater than the set folding angle (e.g., the predetermined folding angle), the internal foldable touch-screen region 126 may be activated, and the external touch-screen region 122 may be deactivated. However, the present inventive concept is not limited thereto.

Figure 5:
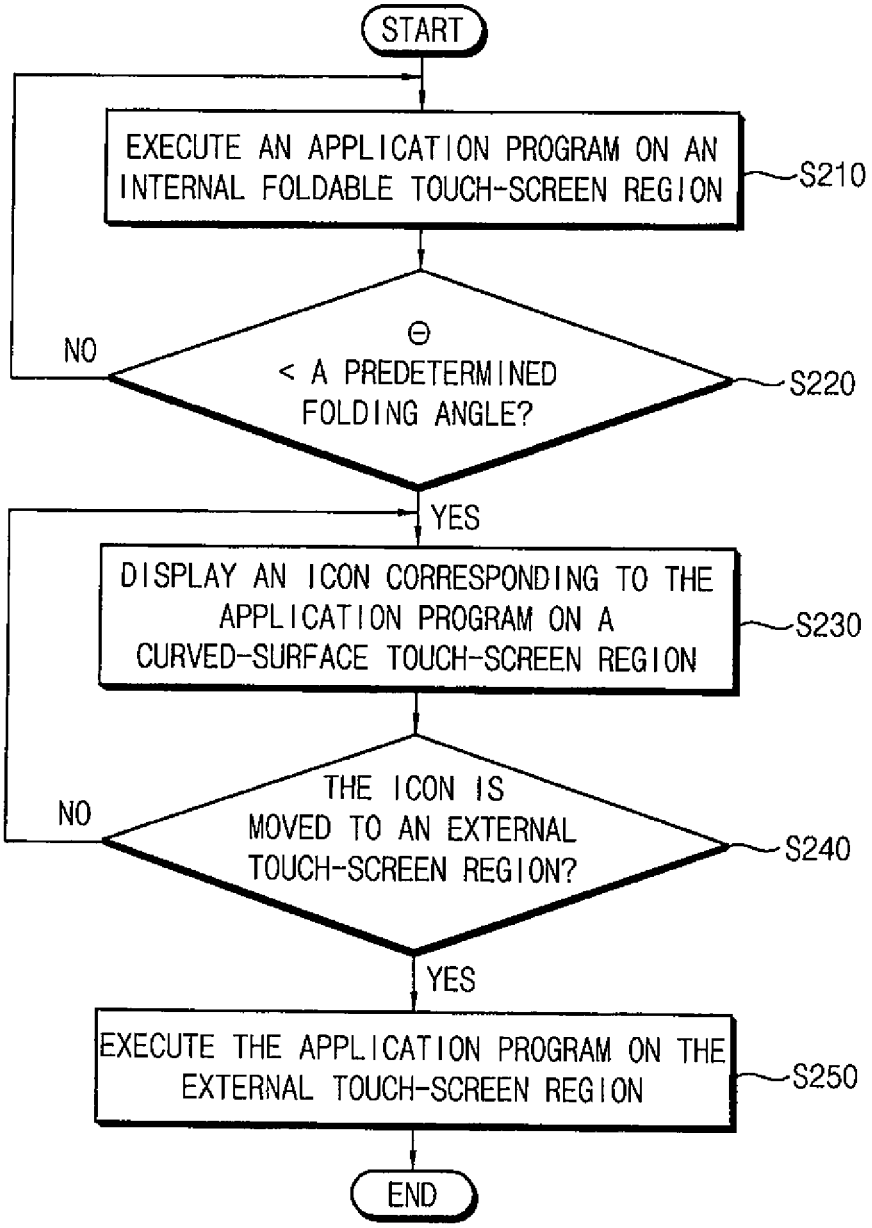
FIG. 5 is a flow chart illustrating another example embodiment in which the mobile device shown in FIG. 1 operates.
Figure 6A:
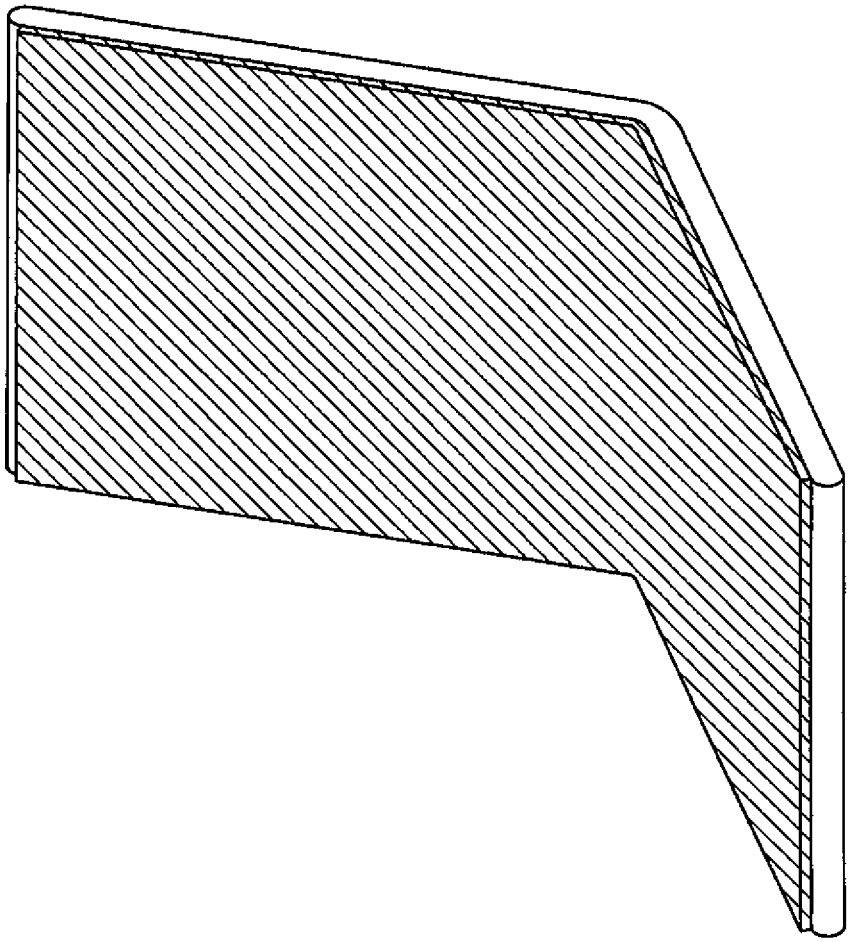
FIGS. 6A, 6B, and 6C are diagrams illustrating another example embodiment in which the mobile device shown in FIG. 1 operates.
Figure 6B:
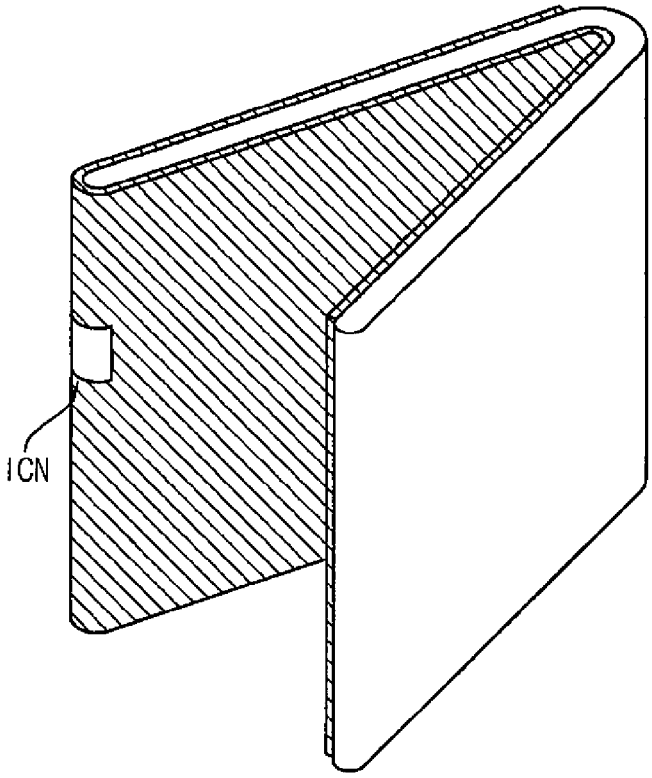
Figure 6C:
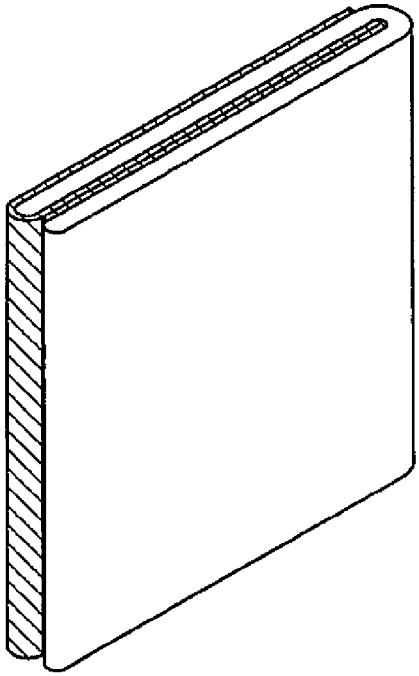

FIG. 5 is a flow chart illustrating another example embodiment in which the mobile device shown in FIG. 1 operates. FIGS. 6A, 6B, and 6C are diagrams illustrating another example embodiment in which the mobile device shown in FIG. 1 operates.

Referring to FIGS. 5, 6A, 6B, and 6C, it is illustrated that the mobile device 100 is in an unfolded state, and then the mobile device 100 is folded. As illustrated in FIG. 6A, the mobile device 100 may execute an application program on the internal foldable touch-screen region 126 (Step S210) when the mobile device 100 is in an unfolded state. Subsequently, the mobile device 100 may sense whether the internal foldable touch-screen region 126 is folded to equal to or smaller than a set folding angle (e.g., a predetermined folding angle) (Step S220). In other words, the mobile device 100 may sense whether a folding angle θ of the internal foldable touch-screen region 126 becomes equal to or smaller than the set of folding angle (e.g., the predetermined folding angle) as the internal foldable touch-screen region 126 is folded. Here, when the internal foldable touch-screen region 126 is folded to greater than the set folding angle (e.g., the predetermined folding angle), the mobile device 100 may continuously execute the application program on the internal foldable touch-screen region 126 (Step S210). On the other hand, as illustrated in FIG. 6B, when the internal foldable touch-screen region 126 is folded to equal to or smaller than the set folding angle (e.g., the predetermined folding angle), the mobile device 100 may display an icon ICN corresponding to the application program on the curved-surface touch-screen region 124 (Step S230). Next, the mobile device 100 may sense whether the icon ICN corresponding to the application program is moved to the external touch-screen region 122 (Step S240). For example, the icon ICN corresponding to the application program may be moved from the curved-surface touch-screen region 124 to the external touch-screen region 122 by a drag-and-drop operation or a click operation according to a user interface. Here, as illustrated in FIG. 6C, when the icon ICN corresponding to the application program is moved to the external touch-screen region 122, the mobile device 100 may execute the application program on the external touch-screen region 122 (Step S250). As described above, when the application program is executed on a part region or an entire region of the external touch-screen region 122 as the internal foldable touch-screen region 126 is folded to equal to or smaller than the set folding angle (e.g., the predetermined folding angle), the internal foldable touch-screen region 126 may be deactivated, and the external touch-screen region 122 may be activated. However, the present inventive concept is not limited thereto.

Figure 7:
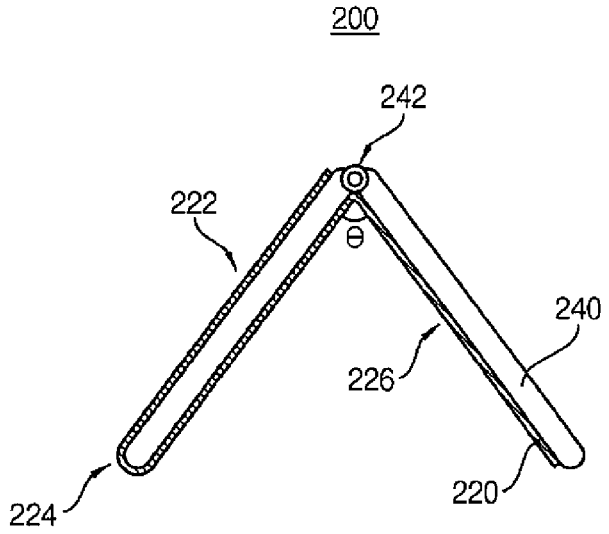
FIG. 7 is a planar view illustrating a mobile device according to example embodiments.
Figure 8:
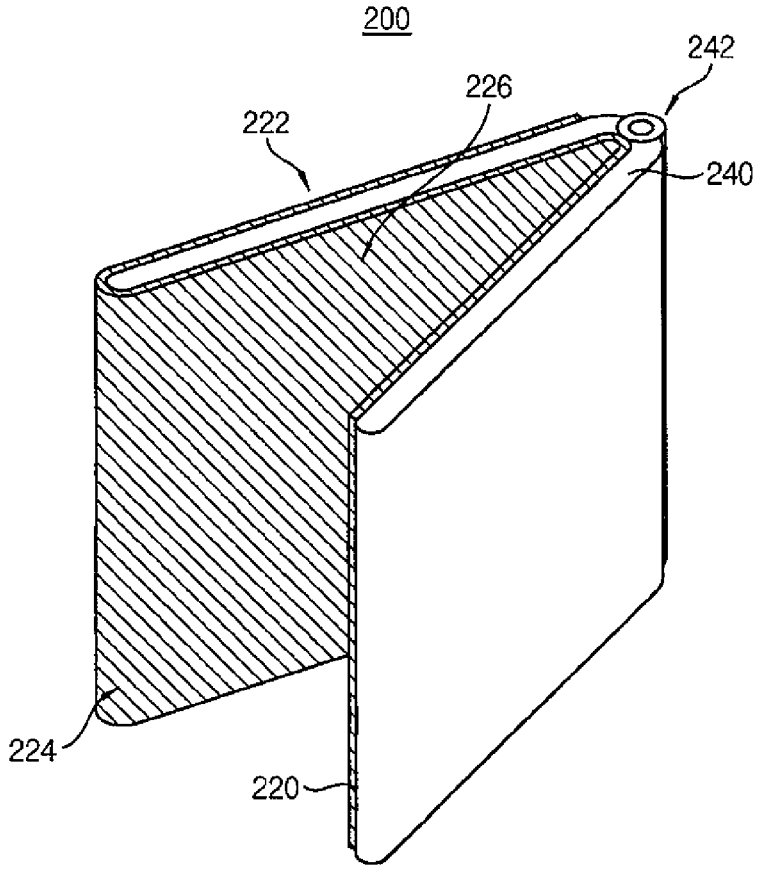
FIG. 8 is a side perspective view illustrating the mobile device shown in FIG. 7.

FIG. 7 is a planar view illustrating a mobile device according to example embodiments. FIG. 8 is a side view illustrating the mobile device shown in FIG. 7.

Referring to FIGS. 7 and 8, the mobile device 200 may include a touch-screen unit (or touch screen) 220 and a body unit (or body) 240 to which the touch-screen unit 220 is attached. Here, the touch-screen unit 220 may correspond to a flexible touch-screen having a flexible display device and a touch sensor device. For example, the mobile device 200 may be implemented as a cellular phone, a smart-phone, a smart-pad, etc. However, a type of the mobile device 200 is not limited thereto.

The touch-screen unit 220 may include an external touch-screen region 222, an internal foldable touch-screen region 226, and a curved-surface touch-screen region 224. Here, the curved-surface touch-screen region 224 may be placed between the external touch-screen region 222 and the internal foldable touch-screen region 226. In other words, the curved-surface touch-screen region 224 may couple the external touch-screen region 222 and the internal foldable touch-screen region 226. The body unit 240 may be manufactured with non-flexible materials, and thus may include a hinge 242 for supporting a folding operation of the internal foldable touch-screen region 226. Therefore, when the body unit 240 is folded or unfolded by users, the internal foldable touch-screen region 226 of the touch-screen unit 220 may be folded or unfolded. Specifically, the mobile device 200 may move at least one icon corresponding to at least one executing application program to the curved-surface touch-screen region 224 in response to a folding angle θ of the internal foldable touch-screen region 226 when a folding operation of the internal foldable touch-screen region 226 is performed (i.e., when the internal foldable touch-screen region 226 is folded or unfolded). For example, a specific application program may be executed on the external touch-screen region 222 when the body unit 240 is in a folded state. Here, as a user unfolds the body unit 240, the mobile device 200 may move an icon corresponding to the specific application program from the external touch-screen region 222 to the curved-surface touch-screen region 224 when a folding angle θ of the internal foldable touch-screen region 226 becomes equal to or greater than a set folding angle (e.g., a predetermined folding angle). In addition, for example, a specific application program may be executed on the internal foldable touch-screen region 226 when the body unit 240 is in an unfolded state. Here, as a user folds the body unit 240, the mobile device 200 may move an icon corresponding to the specific application program from the internal foldable touch-screen region 226 to the curved-surface touch-screen region 224 when a folding angle θ of the internal foldable touch-screen region 226 becomes equal to or smaller than a set folding angle (e.g., a predetermined folding angle).

In one example embodiment, when the internal foldable touch-screen region 226 is unfolded to equal to or greater than a first folding angle, the mobile device 200 may display an icon corresponding to an application program that is executed on the external touch-screen region 222 on the curved-surface touch-screen region 224. Subsequently, the mobile device 200 may execute the application program on a part region or an entire region of the internal foldable touch-screen region 226 if the icon corresponding to the application program is moved from the curved-surface touch-screen region 224 to the internal foldable touch-screen region 226 by a drag-and-drop operation or a click operation according to a user interface. In another example embodiment, when the internal foldable touch-screen region 226 is folded to equal to or smaller than a second folding angle, the mobile device 200 may display an icon corresponding to an application program that is executed on the internal foldable touch-screen region 226 on the curved-surface touch-screen region 224. Subsequently, the mobile device 200 may execute the application program on a part region or an entire region of the external touch-screen region 222 if the icon corresponding to the application program is moved from the curved-surface touch-screen region 224 to the external touch-screen region 222 by the drag-and-drop operation or the click operation according to the user interface. In one example embodiment, the first folding angle may be substantially the same as the second folding angle. In another example embodiment, the first folding angle may be different from the second folding angle. Additionally, the internal foldable touch-screen region 226 may have a first internal touch-screen region (e.g., a left internal touch-screen region) and a second internal touch-screen region (e.g., a right internal touch-screen region). Here, the first internal touch-screen region and the second internal touch-screen region may be divided with respect to a folding reference line on which the internal foldable touch-screen region 226 is folded. In one example embodiment, the first internal touch-screen region and the second internal touch-screen region may be physically separated. In another example embodiment, as illustrated in FIG. 7, the first internal touch-screen region and the second internal touch-screen region may be physically coupled.

In addition, when an application program is executed on a part region or an entire region of the internal foldable touch-screen region 226 as the internal foldable touch-screen region 226 is unfolded to equal to or greater than the first folding angle, the internal foldable touch-screen region 226 may be activated, and the external touch-screen region 222 may be deactivated. In this case, a touch sensor function and a display function of the external touch-screen region 222 may be deactivated. Alternatively, a touch sensor function or a display function of the external touch-screen region 222 may be deactivated. Similarly, when an application program is executed on a part region or an entire region of the external touch-screen region 222 as the internal foldable touch-screen region 226 is folded to equal to or smaller than the second folding angle, the internal foldable touch-screen region 226 may be deactivated, and the external touch-screen region 222 may be activated. In this case, a touch sensor function and a display function of the internal foldable touch-screen region 226 may be deactivated. Alternatively, a touch sensor function or a display function of the internal foldable touch-screen region 226 may be deactivated. However, the present inventive concept is not limited thereto. For example, when certain conditions are met, the external touch-screen region 222 and the internal foldable touch-screen region 226 may be concurrently activated. That is, a user may use both the external touch-screen region 222 and the internal foldable touch-screen region 226 even when an application program is executed on a part region or an entire region of the internal foldable touch-screen region 226 as the internal foldable touch-screen region 226 is unfolded to equal to or greater than the first folding angle, or even when an application program is executed on a part region or an entire region of the external touch-screen region 222 as the internal foldable touch-screen region 226 is folded to equal to or smaller than the second folding angle.

In brief, the mobile device 200 may include the flexible touch-screen having the external touch-screen region 222, the internal foldable touch-screen region 226, and the curved-surface touch-screen region 224 that is placed between the external touch-screen region 222 and the internal foldable touch-screen region 226. Here, the mobile device 200 may provide users with a user interface that selectively executes an application program on the external touch-screen region 222 or the internal foldable touch-screen region 226 by moving an icon corresponding to an executing application program to the curved-surface touch-screen region 224 in response to a folding angle 9 of the internal foldable touch-screen region 226 when a folding operation of the internal foldable touch-screen region 226 is performed (i.e., when the internal foldable touch-screen region 226 is folded or unfolded). As a result, a user may efficiently and conveniently user the mobile device 200. Additionally, since the touch-screen unit 220 corresponds to the flexible touch-screen having the flexible display device and the touch sensor device, the body unit 240 may include a display controller that controls a display function of the touch-screen unit 220 and a touch sensor controller that controls a touch sensor function of the touch-screen unit 220. In addition, the body unit 240 may include function sensors to detect various operations for the mobile device 200. For example, a folding function sensor of the function sensors may detect a folding operation of the mobile device 200.

Figure 9A:
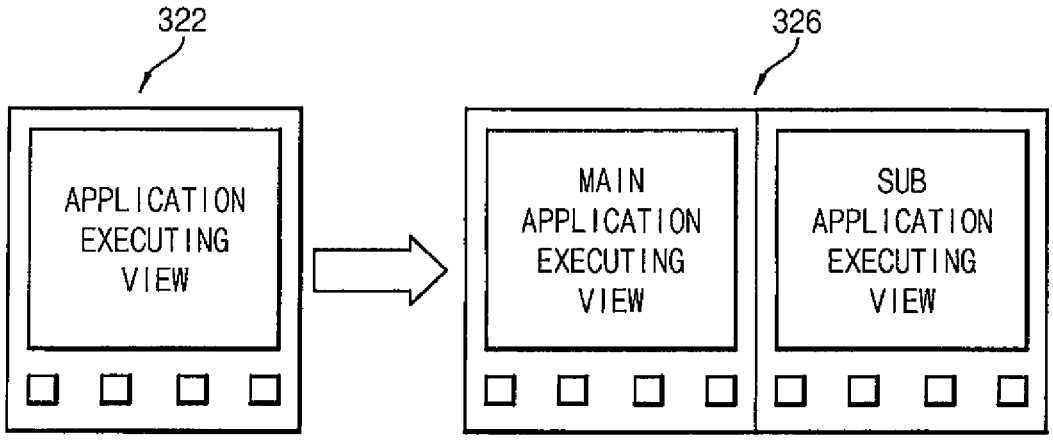
FIGS. 9A and 9B are diagrams illustrating an example embodiment in which an application program is executed by a mobile device according to example embodiments.
Figure 9B:
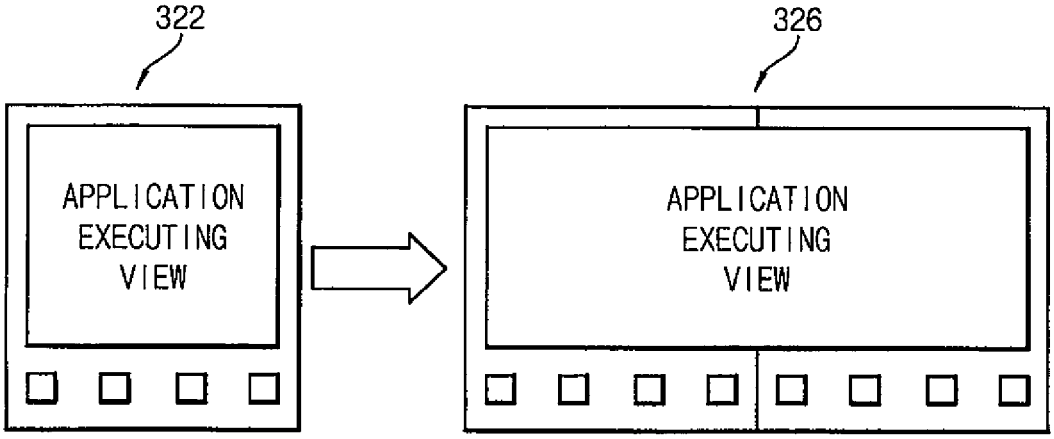

FIGS. 9A and 9B are diagrams illustrating an example in which an application program is executed by a mobile device according to example embodiments.

Referring to FIGS. 9A and 9B, it is illustrated that an icon corresponding to an application program executed on an external touch-screen region 322 is displayed on a curved-surface touch-screen region when an internal foldable touch-screen region 326 is unfolded to equal to or greater than a set folding angle (e.g., a predetermined folding angle), and then the application program is executed on the internal foldable touch-screen region 326 when the icon corresponding to the application program is moved from the curved-surface touch-screen region to the internal foldable touch-screen region 326 by a drag-and-drop operation and/or a click operation according to a user interface. In FIG. 9A, the application program may be executed on a part region of the internal foldable touch-screen region 326. In FIG. 9B, the application program may be executed on an entire region of the internal foldable touch-screen region 326. As described above, when the application program is executed on the internal foldable touch-screen region 326, the external touch-screen region 322 may be deactivated. On the other hand, when the application program is executed on the external touch-screen region 322, the internal foldable touch-screen region 326 may be deactivated.

In one example embodiment, the application program may be a phone-call application program. For example, caller identification information may be displayed on the external touch-screen region 322 when a mobile device (e.g., a smart-phone) receives a phone-call, and then the phone-call may be answered by a user's touch-input (e.g., a swipe operation, a double click operation, etc.). Here, when the user unfolds the mobile device to execute other application programs (e.g., internet web browser), an icon corresponding to the phone-call application program may be displayed on the curved-surface touch-screen region. Subsequently, a video phone-call may be performed on the internal foldable touch-screen region 326 when the icon corresponding to the phone-call application program is moved to the internal foldable touch-screen region 326 by the user (e.g., by a drag-and-drop operation, etc.). In FIG. 9A, the phone-call application program may be executed on a first part region of the internal foldable touch-screen region 326, and other application programs (e.g., internet web browser) may be executed on a second part region of the internal foldable touch-screen region 326. On the other hand, in FIG. 9B, the phone-call application program may be executed on an entire region of the internal foldable touch-screen region 326.

In another example embodiment, the application program may be a messenger application program. For example, a message may be displayed on the external touch-screen region 322 when a mobile device (e.g., a smart-phone) receives the message, and then the messenger application program may begin by a user's touch-input (e.g., a swipe operation, a double click operation, etc.). Here, when the user unfolds the mobile device to execute other application programs (e.g., internet web browser), an icon corresponding to the messenger application program may be displayed on the curved-surface touch-screen region. Subsequently, the messenger application program may be performed on the internal foldable touch-screen region 326 when the icon corresponding to the messenger application program is moved to the internal foldable touch-screen region 326 by the user (e.g., by a drag-and-drop operation, etc.). In FIG. 9A, the messenger application program may be executed on a first part region of the internal foldable touch-screen region 326, and other application programs (e.g., internet web browser) may be executed on a second part region of the internal foldable touch-screen region 326. On the other hand, in FIG. 9B, the messenger application program may be executed on an entire region of the internal foldable touch-screen region 326.

As described above, a mobile device according to example embodiments may include a flexible touch-screen having the external touch-screen region 322, the internal foldable touch-screen region 326, and the curved-surface touch-screen region that couples the external touch-screen region 322 and the internal foldable touch-screen region 326. Thus, the mobile device may provide users with a user interface that executes an application program on the internal foldable touch-screen region 326 by moving an icon corresponding to the application program that is executed on the external touch-screen region 322 in a folded state of the internal foldable touch-screen region 326 to the curved-surface touch-screen region in response to a folding angle of the internal foldable touch-screen region 326 when the internal foldable touch-screen region 326 is unfolded. Although the phone-call application program and the messenger application program are described with reference to FIGS. 9A and 9B, a type of application program is not limited thereto. That is, the application program may be any application program that is executed by the mobile device (e.g., smart-phone, smart-pad, etc.). For example, the application program may be an internet application program (e.g., internet web browser), a calendar application program, a camera application program, a camcorder application program, etc.

Figure 10A:
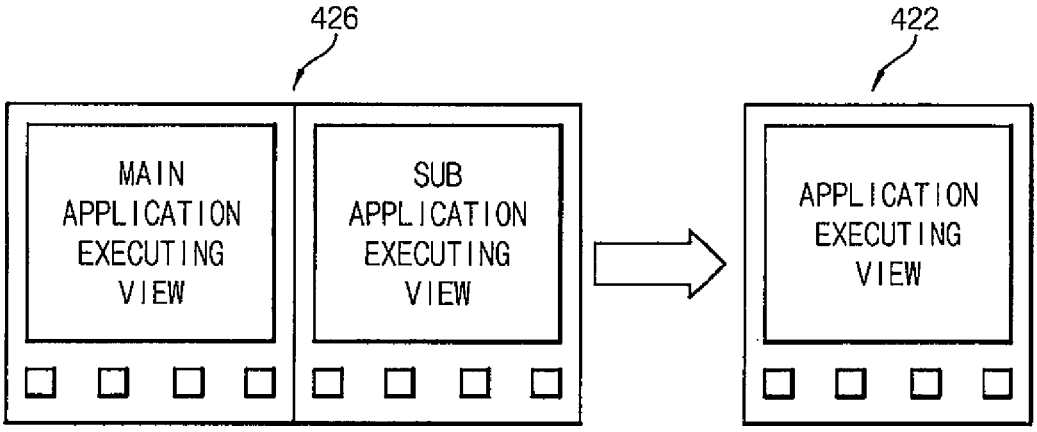
FIGS. 10A and 10B are diagrams illustrating another example embodiment in which an application program is executed by a mobile device according to example embodiments.
Figure 10B:
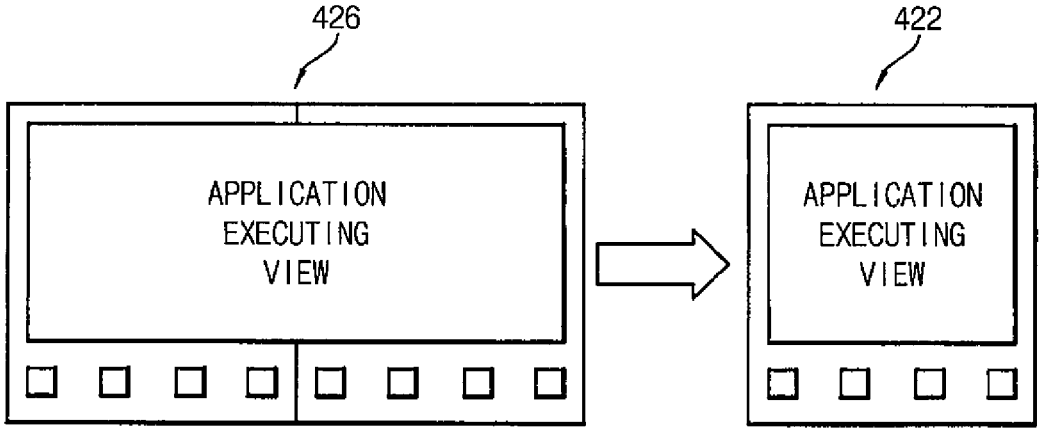

FIGS. 10A and 10B are diagrams illustrating another example in which an application program is executed by a mobile device according to example embodiments.

Referring to FIGS. 10A and 10B, it is illustrated that an icon corresponding to an application program executed on an internal foldable touch-screen region 426 is displayed on a curved-surface touch-screen region when the internal foldable touch-screen region 426 is folded to equal to or smaller than a set folding angle (e.g., a predetermined folding angle), and then the application program is executed on the external touch-screen region 422 when the icon corresponding to the application program is moved from the curved-surface touch-screen region to the external touch-screen region 422 by a drag-and-drop operation and/or a click operation according to a user interface. In FIG. 10A, the application program may be executed on a part region of the internal foldable touch-screen region 426. In FIG. 10B, the application program may be executed on an entire region of the internal foldable touch-screen region 426. As described above, when the application program is executed on the internal foldable touch-screen region 426, the external touch-screen region 422 may be deactivated. On the other hand, when the application program is executed on the external touch-screen region 422, the internal foldable touch-screen region 426 may be deactivated. Here, the application program may be any application program that is executed by a mobile device (e.g., smart-phone, smart-pad, etc.). For example, the application program may be a phone-call application program, a messenger application program, an Internet application program (e.g., internet web browser), a calendar application program, a camera application program, a camcorder application program, etc.

As described above, a mobile device according to example embodiments may include a flexible touch-screen having the external touch-screen region 422, the internal foldable touch-screen region 426, and the curved-surface touch-screen region that couples the external touch-screen region 422 and the internal foldable touch-screen region 426. Thus, the mobile device may provide users with a user interface that executes an application program on the external touch-screen region 422 by moving an icon corresponding to the application program that is executed on the internal foldable touch-screen region 426 in a unfolded state of the internal foldable touch-screen region 426 to the curved-surface touch-screen region in response to a folding angle of the internal foldable touch-screen region 426 when the internal foldable touch-screen region 426 is folded. Although a few example embodiments have been described, those skilled in the art will readily appreciate that many modifications are possible in the example embodiments without materially departing from the novel teachings and aspects of embodiments of the present inventive concept. For example, the present inventive concept may be applied to a mobile device that includes a body unit and a touch-screen unit attached to the body unit, where the touch-screen unit has a first internal touch-screen region (e.g., a left internal touch-screen region), a second internal touch-screen region (e.g., a right internal touch-screen region), a first external touch-screen region (e.g., a left external touch-screen region), and a second external touch-screen region (e.g., a right external touch-screen region).

The present inventive concept may be applied to any electronic device (e.g., a mobile device) including a flexible touch-screen. For example, the present inventive concept may be applied to a cellular phone, a smart-phone, a smart-pad, a personal digital assistants (PDA), a portable multimedia player (PMP), an MP3 player, a television, a computer monitor, a laptop, a digital camera, a camcorder, a game console, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and aspects of embodiments of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

[1. A mobile device comprising:

a touch-screen having an external touch-screen region, an internal foldable touch-screen region, and a curved-surface touch-screen region that couples the external touch-screen region and the internal foldable touch-screen region; and a body to which the touch-screen is attached, wherein the device is configured to move at least one icon corresponding to at least one executing application program to the curved-surface touch-screen region in response to a folding angle of the internal foldable touch-screen region when a folding operation of the internal foldable touch-screen region is performed.]

[2. The device of claim 1, wherein the touch-screen is a flexible touch-screen comprising a flexible display device and a touch sensor device.]

[3. The device of claim 2, wherein the body comprises a flexible material, and wherein the body is configured to support the folding operation of the internal foldable touch-screen region.]

[4. The device of claim 2, wherein the body comprises a non-flexible material, and wherein the body comprises a hinge configured to support the folding operation of the internal foldable touch-screen region.]

[5. The device of claim 2, wherein the internal foldable touch-screen region comprises a first internal touch-screen region and a second internal touch-screen region, and wherein the first internal touch-screen region and the second internal touch-screen region are physically coupled.]

[6. The device of claim 2, wherein the internal foldable touch-screen region comprises a first internal touch-screen region and a second internal touch-screen region, and wherein the first internal touch-screen region and the second internal touch-screen region are physically separated.]

[7. The device of claim 1, wherein the device is configured to display the at least one icon corresponding to the executing application program, when executed on the external touch-screen region, on the curved-surface touch-screen region when the internal foldable touch-screen region is unfolded to equal to or greater than a first folding angle, and wherein the device is configured to execute the executing application program on a part region or an entire region of the internal foldable touch-screen region when the at least one icon is moved to the internal foldable touch-screen region.]

[8. The device of claim 7, wherein the device is configured to display the at least one icon corresponding to the executing application program, when executed on the internal foldable touch-screen region, on the curved-surface touch-screen region when the internal foldable touch-screen region is folded to equal to or smaller than a second folding angle, and wherein the device is configured to execute the executing application program on a part region or an entire region of the external touch-screen region when the at least one icon is moved to the external touch-screen region.]

[9. The device of claim 8, wherein the at least one icon is moved from the curved-surface touch-screen region to the internal foldable touch-screen region or the external touch-screen region by a drag-and-drop operation or a click operation according to a user interface.]

[10. The device of claim 9, wherein the first folding angle is the same as the second folding angle, or is different from the second folding angle.]

[11. The device of claim 10, wherein the internal foldable touch-screen region is activated and the external touch-screen region is deactivated when the internal foldable touch-screen region is unfolded to equal to or greater than the first folding angle.]

[12. The device of claim 11, wherein the internal foldable touch-screen region is deactivated and the external touch-screen region is activated when the internal foldable touch-screen region is folded to equal to or smaller than the second folding angle.]

[13. A method of operating a mobile device, the method comprising:

executing an application program on an external touch-screen region;

displaying an icon corresponding to the application program on a curved-surface touch-screen region that couples the external touch-screen region and an internal foldable touch-screen region when the internal foldable touch-screen region is unfolded to equal to or greater than a folding angle; and executing the application program on a part region or an entire region of the internal foldable touch-screen region when the icon is moved to the internal foldable touch-screen region according to a user interface.]

[14. The method of claim 13, wherein the external touch-screen region, the internal foldable touch-screen region, and the curved-surface touch-screen region correspond to respective regions of a flexible touch-screen comprising a flexible display device and a touch sensor device.]

[15. The method of claim 14, wherein the internal foldable touch-screen region is activated and the external touch-screen region is deactivated when the internal foldable touch-screen region is unfolded to equal to or greater than the folding angle.]

[16. The method of claim 15, wherein the icon is moved from the curved-surface touch-screen region to the internal foldable touch-screen region by a drag-and-drop operation or a click operation according to the user interface.]

[17. A method of operating a mobile device, the method comprising:

executing an application program on an internal foldable touch-screen region;

displaying an icon corresponding to the application program on a curved-surface touch-screen region that couples an external touch-screen region and the internal foldable touch-screen region when the internal foldable touch-screen region is folded to equal to or smaller than a folding angle; and executing the application program on a part region or an entire region of the external touch-screen region when the icon is moved to the external touch-screen region according to a user interface.]

[18. The method of claim 17, wherein the external touch-screen region, the internal foldable touch-screen region, and the curved-surface touch-screen region correspond to respective regions of a flexible touch-screen comprising a flexible display device and a touch sensor device.]

[19. The method of claim 18, wherein the internal foldable touch-screen region is deactivated and the external touch-screen region is activated when the internal foldable touch-screen region is folded to equal to or smaller than the folding angle.]

[20. The method of claim 19, wherein the icon is moved from the curved-surface touch-screen region to the external touch-screen region by a drag-and-drop operation or a click operation according to the user interface.]

*21. A flexible touch-screen device comprising:*

*a flexible touch-screen configured to display an image, and comprising:*

*a first touch-screen region; and*

*a second touch-screen region that is inwardly foldable such that respective regions of the flexible touch-screen face each other while the second touch-screen region is in a folded state; and*

*a body to which the first touch-screen region and the second touch-screen region are attached,*

*wherein the flexible touch-screen device is configured to display an executing application program on the first touch-screen region while the second touch-screen region is in the folded state, and to display the executing application program on a first part region or an entire region of the second touch-screen region when a state of the second touch-screen region is changed from the folded state to an unfolded state, and*

*wherein the first touch-screen region and the first part region or a second part region of the second touch-screen region face away from each other both in the folded state and in the unfolded state.*

*22. The device of claim 21, wherein the device is further configured to display the executing application program on the second touch-screen region while the second touch-screen region is in the unfolded state and to display the executing application program on a part region or an entire region of the first touch-screen region when the state of the second touch-screen region is changed from the unfolded state to the folded state.*

*23. The device of claim 21, wherein the body comprises a hinge configured to support a folding operation of the second touch-screen region.*

*24. The device of claim 21, wherein the second touch-screen region is activated and the first touch-screen region is deactivated when the second touch-screen region is unfolded to equal to or greater than a first folding angle.*

*25. The device of claim 21, wherein the second touch-screen region is deactivated and the first touch-screen region is activated when the second touch-screen region is folded to equal to or smaller than a second folding angle.*

*26. A method of operating a flexible touch-screen device that comprises a flexible touch-screen configured to display an image and comprising a first touch-screen region, and a second touch-screen region that is inwardly foldable such that respective regions of the flexible touch-screen face each other while the second touch-screen region is in a folded state, and that also comprises a body to which the first touch-screen region and the second touch-screen region are attached, the method comprising:*

*displaying an executing application program on the first touch-screen region while the second touch-screen region is in the folded state such that the respective regions of the flexible touch-screen face each other;*

*detecting whether a state of the second touch-screen region is changed from the folded state to an unfolded state; and*

*displaying the executing application program on a first part region or an entire region of the second touch-screen region when the state of the second touch-screen region is changed from the folded state to the unfolded state,*

*wherein the first touch-screen region and the first part region or a second part region of the second touch-screen region face away from each other both in the folded state and in the unfolded state.*

*27. The method of claim 26, further comprising:*

*displaying the executing application program on the second touch-screen region while the second touch-screen region is in the unfolded state;*

*detecting whether the state of the second touch-screen region is changed from the unfolded state to the folded state; and*

*displaying the executing application program on a part region or an entire region of the first touch-screen region when the state of the second touch-screen region is changed from the unfolded state to the folded state.*

*28. The method of claim 26, wherein the body comprises a hinge configured to support a folding operation of the second touch-screen region.*

*29. The method of claim 26, further comprising:*

*activating the second touch-screen region when the second touch-screen region is unfolded to equal to or greater than a first folding angle; and*

*deactivating the first touch-screen region when the second touch-screen region is unfolded to equal to or greater than the first folding angle.*

*30. The method of claim 26, further comprising:*

*deactivating the second touch-screen region when the second touch-screen region is folded to equal to or smaller than a second folding angle; and*

*activating the first touch-screen region when the second touch-screen region is folded to equal to or smaller than the second folding angle.*

* * * * *